US012064784B2

(12) United States Patent
Wiener

(10) Patent No.: US 12,064,784 B2
(45) **Date of Patent: *Aug. 20, 2024**

(54) PAINT APPLICATOR, KIT AND METHOD

(71) Applicant: DESIGNING SOLUTIONS, LLC, Chestertown, MD (US)

(72) Inventor: Deborah Wiener, Chestertown, MD (US)

(73) Assignee: Designing Solutions, LLC, Chestertown, MD (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/881,928

(22) Filed: Aug. 5, 2022

(65) Prior Publication Data

US 2022/0371046 A1 Nov. 24, 2022

Related U.S. Application Data

(63) Continuation of application No. 17/177,023, filed on Feb. 16, 2021, now Pat. No. 11,413,644, which is a (Continued)

(51) Int. Cl.

| | |
|---|---|
| ***A46B 11/04*** | (2006.01) |
| ***A46B 11/00*** | (2006.01) |
| ***B05C 1/00*** | (2006.01) |
| ***B05C 17/00*** | (2006.01) |
| ***B05C 17/025*** | (2006.01) |

(Continued)

(52) U.S. Cl.

CPC ............ *B05C 1/00* (2013.01); *A46B 11/0024* (2013.01); *A46B 11/0027* (2013.01); *A46B 11/0034* (2013.01); *B05C 17/003* (2013.01); *B05C 17/025* (2013.01); *B05C 17/0308* (2013.01); *B05C 17/0333* (2013.01); *B05D 1/28* (2013.01); *A46B 11/0062* (2013.01); *A46B 11/0065* (2013.01); *A46B 2200/202* (2013.01)

(58) Field of Classification Search

CPC ........... B05C 1/00; B05C 17/003; B05D 1/28; A46B 2200/202; A46B 11/0024; A46B 11/0027; A46B 11/0062; A46B 11/0065

See application file for complete search history.

(56) References Cited

U.S. PATENT DOCUMENTS

| | | | |
|---|---|---|---|
| 1,085,234 | A | 1/1914 | Allan |
| 1,337,998 | A | 4/1920 | Church |

(Continued)

*Primary Examiner* — Jennifer C Chiang

(74) *Attorney, Agent, or Firm* — Calderon, Safran & Wright P.C.

(57) ABSTRACT

A paint applicator, kit and methodology for using the same is disclosed. For example, a paint applicator that allows a user to load a desired amount of paint, such as a water based or other low VOC paint, into the paint applicator and an advancement mechanism that dispenses paint at a rate controllable by the user is disclosed. The advancement mechanism can include a system that translates a rotational force applied to an end cap of the applicator into a linear force that advances a piston which in turn applies paint to an applicator portion. The paint applicator may be reusable or may include a ratchet system that allows for only one time use. The methodology and kit can incorporate a syringe for loading paint into the paint applicator, thus reducing the loss of paint through spilling.

21 Claims, 7 Drawing Sheets

Related U.S. Application Data continuation of application No. 16/413,154, filed on May 15, 2019, now Pat. No. 10,919,069, which is a continuation of application No. 15/695,353, filed on Sep. 5, 2017, now Pat. No. 10,293,360, which is a continuation of application No. 13/733,823, filed on Jan. 3, 2013, now abandoned.

(60) Provisional application No. 61/582,746, filed on Jan. 3, 2012.

(51) Int. Cl.

*B05C 17/03* (2006.01)
*B05D 1/28* (2006.01)

(56) References Cited

U.S. PATENT DOCUMENTS

| | | | |
|---|---|---|---|
| 1,393,841 | A | 10/1921 | Simmons |
| 1,417,642 | A | 5/1922 | Tallman |
| 1,548,259 | A | 8/1925 | Erikson |
| 2,121,239 | A | 6/1938 | Ashley |
| 2,264,564 | A | 12/1941 | Connor |
| 2,328,048 | A | 8/1943 | Bair |
| 2,554,287 | A | 5/1951 | Wilson |
| 4,624,594 | A | 11/1986 | Sasaki et al. |
| 4,732,503 | A | 3/1988 | Bader et al. |
| 4,875,791 | A | 10/1989 | Hassan |
| 4,997,371 | A | 3/1991 | Fischer |
| 5,123,766 | A | 6/1992 | Babiak |
| 5,242,234 | A | 9/1993 | Ahrens |
| 5,496,123 | A | 3/1996 | Gaither |
| 5,636,931 | A | 6/1997 | Gueret |
| 5,697,918 | A | 12/1997 | Fischer et al. |
| 5,803,640 | A | 9/1998 | Nakajima et al. |
| 5,890,829 | A | 4/1999 | Hesse |
| 6,161,978 | A | 12/2000 | Dovellos |
| 6,227,739 | B1 | 5/2001 | Kageyama |
| 6,283,660 | B1 | 9/2001 | Furlong et al. |
| 6,435,751 | B1 | 8/2002 | Ono et al. |
| 6,474,891 | B1 | 11/2002 | Liu |
| 6,488,429 | B2 | 12/2002 | Korper |
| 6,726,389 | B1 * | 4/2004 | Lee .................... B05C 17/0325 141/205 |
| 6,752,558 | B1 | 6/2004 | Hsu |
| 6,793,431 | B1 | 9/2004 | Tsai |
| 6,974,092 | B1 | 12/2005 | Leventhal |
| 7,182,538 | B2 | 2/2007 | Grosso et al. |
| 7,338,225 | B1 | 3/2008 | Taylor |
| 7,556,447 | B2 | 7/2009 | Bruggeman et al. |
| 7,682,098 | B2 | 3/2010 | Sandahl et al. |
| 7,854,562 | B2 | 12/2010 | Peterson et al. |
| 8,092,108 | B2 | 1/2012 | Bainbridge et al. |
| 8,152,399 | B2 | 4/2012 | Lasfargues et al. |
| 8,328,449 | B2 | 12/2012 | Wightman et al. |
| 8,740,489 | B2 | 6/2014 | Kageyama et al. |
| 8,845,221 | B2 | 9/2014 | Fukumoto |
| 8,905,666 | B2 | 12/2014 | Ooba |
| 9,161,604 | B2 | 10/2015 | Nakamura et al. |
| 10,919,069 | B2 | 2/2021 | Wiener |
| 2002/0127045 | A1 | 9/2002 | Cookfair et al. |
| 2005/0063766 | A1 | 3/2005 | Chen et al. |
| 2005/0072442 | A1 | 4/2005 | Licari et al. |
| 2005/0141949 | A1 | 6/2005 | Calabro |
| 2006/0243824 | A1 | 11/2006 | Juo |
| 2007/0248402 | A1 | 10/2007 | Chan |
| 2007/0280776 | A1 | 12/2007 | Castellana |
| 2008/0075525 | A1 | 3/2008 | Lewis |
| 2009/0052971 | A1 | 2/2009 | Pires et al. |
| 2009/0297253 | A1 | 12/2009 | Yuu |
| 2013/0114990 | A1 | 5/2013 | Sandahl et al. |
| 2013/0171362 | A1 | 7/2013 | Wiener |
| 2015/0016860 | A1 | 1/2015 | Pierre |
| 2017/0217244 | A1 | 8/2017 | Fehlmann et al. |
| 2021/0237112 | A1 | 8/2021 | Wiener |

* cited by examiner

PAINT APPLICATOR, KIT AND METHOD

CROSS-REFERENCE TO RELATED APPLICATIONS AND CLAIM TO PRIORITY

This application is a continuation of Non-provisional application Ser. No. 17/177,023, now U.S. Pat. No. 11,413,644, filed Feb. 16, 2021, which is a continuation of Non-provisional application Ser. No. 16/413,154, now U.S. Pat. No. 10,919,069, filed May 15, 2019, which is a continuation of Non-provisional application Ser. No. 15/695,353, now U.S. Pat. No. 10,293,360, filed Sep. 5, 2017, which is a continuation of Non-provisional application Ser. No. 13/733,823 filed Jan. 3, 2013, which claims priority to Provisional Application Ser. No. 61/582,746 filed Jan. 3, 2012, the disclosures of which are incorporated herein by reference and to which priority is claimed.

BACKGROUND

Technical Field

The presently disclosed subject matter relates to a fillable instrument that dispenses paint through a tip onto a surface in order to repair blemishes, and more particularly, to an instrument for dispensing paint that includes an advancement mechanism for supplying paint at a rate that can be controlled by the user, and a related method and kit for using same.

Related Art

Conventional approaches to applying paint typically involve the use of an instrument, such as a paint brush or paint roller, and a container where the paint is stored. This approach can be efficient for larger painting projects where there is an expectation that all of the paint will be used. However, touch-up and finishing projects typically require a smaller amount of paint and are often done sometime after the original paint job was completed. In these cases, a user will typically need to find the original paint container and use a painting instrument to make the desired touch-ups. This approach often results in spilled paint as the user moves the paint container to each location requiring a touch-up. In many cases, more paint is spilled or lost than is actually needed for the touch-up project.

In view of the foregoing drawbacks, it would be desirable to have a system and methodology that provides a user with a portable and easily maneuverable paint applicator that minimizes the risk of spills and lost paint.

SUMMARY OF THE DISCLOSED EMBODIMENTS

The disclosed embodiments provide a fillable and adjustable paint applicator capable of interchangeably receiving a variety of different paints and a variety of paint applicators. According to one embodiment, the paint applicator includes a cylindrical, pen-shaped body capable of holding a paint, an applicator structure for dispensing the paint onto a surface and an advancement mechanism for forcing the paint into the applicator. The applicator structure can be one of a variety of applicators, such as paint brushes having a variety of shapes or a sponge or other mechanisms for applying paint. The applicator structure can be coupled to the pen-shaped body of the paint applicator through a variety of mechanisms. Thus, the disclosed embodiments provide for a removable and replaceable applicator allowing the user to apply paint through a variety of techniques.

The disclosed embodiments also provide for a cylindrical shaped pen-shaped body which is capable of receiving and storing paints. Paint can be loaded in an interior volume of the pen-shaped body by removing a cap which allows the paint to be poured or otherwise injected or placed into the pen-shaped body. In an alternate embodiment, the pen-shaped body is capable of receiving a pre-loaded paint cartridge which can be inserted and fitted into the pen-shaped body obviating the need to pour the paint directly into the pen-shaped body. The disclosed paint applicator also includes an end cap. The end cap covers the non-applicator end of the device and can be removed in order to add paint to the pen-shaped body. In one embodiment, the end cap also engages an advancement mechanism which pushes the paint toward the applicator. The advancement mechanism may include a piston mechanism which moves in a linear direction in response to the rotation of the end cap. Thus, the paint can be forced through the applicator toward a tip through the twisting motion of the end cap. The disclosed embodiments also include a cover which can be snapped on to the applicator in order to prevent drying of the applicator tip.

The disclosed embodiments also provide a paint applicator, including a cylindrical main body having a first end and a second end, the cylindrical main body defining an interior volume configured to receive a paint, an applicator structure disposed at the first end of the cylindrical main body, the applicator structure in fluid communication with the interior volume of the cylindrical main body, the applicator structure including a tip for applying the paint to a surface, an advancement mechanism for advancing the paint from the interior volume to the applicator structure, the advancement mechanism including an advancement arm and a piston with threaded piston rod, the advancement arm including threads for engaging the threaded piston rod and an end cap disposed adjacent the second end of the cylindrical main body, the end cap engaged to an end of the advancement arm.

The disclosed embodiments also provide a paint applicator kit, including an applicator including a cylindrical main body having a first end and a second end, the cylindrical main body defining an interior volume configured to receive a paint, an applicator structure disposed at the first end of the cylindrical main body, the applicator structure in fluid communication with the interior volume of the cylindrical main body, the applicator structure including a tip for applying the paint to a surface, an advancement mechanism for advancing the paint from the interior volume to the applicator structure, the advancement mechanism including a base and a piston with piston rod, the base including threads engaging the piston rod, an end cap disposed adjacent the second end of the cylindrical main body, the end cap engaged to an end of the advancement mechanism and a paint transfer structure configured to transfer paint from a paint reservoir to the interior volume of the main body of the applicator structure.

The disclosed embodiments further provide a method for use of a paint applicator, including providing an applicator including a cylindrical main body having a first end and a second end, the cylindrical main body defining an interior volume configured to receive a paint, an applicator structure configured to be disposed at the first end of the cylindrical main body, the applicator structure including a tip for applying the paint to a surface, an advancement mechanism configured to advance the paint from the interior volume to the applicator structure, the advancement mechanism including a piston with piston rod, providing a paint transfer structure configured to transfer paint from a paint reservoir to the interior volume of the main body of the applicator, transferring paint from the paint reservoir to the paint transfer structure, transferring paint from the paint transfer structure to the interior volume of the main body of the applicator via the first end of the main body, placing the applicator structure in the first end of the main body such that the paint is in fluid communication with both the applicator structure and the interior volume of the main body and actuating the advancement mechanism such that the piston and piston rod move within the interior volume of the main body and cause paint from the interior volume to move to the applicator structure.

BRIEF DESCRIPTION OF THE DRAWINGS

These and other characteristics of the presently disclosed subject matter will become clear from the following description with reference to the accompanying drawings, wherein.

DETAILED DESCRIPTION OF THE EXEMPLARY EMBODIMENTS

The presently disclosed subject matter will be described in detail hereinafter with reference to exemplary embodiments shown in the accompanying drawings.

Figure 1:
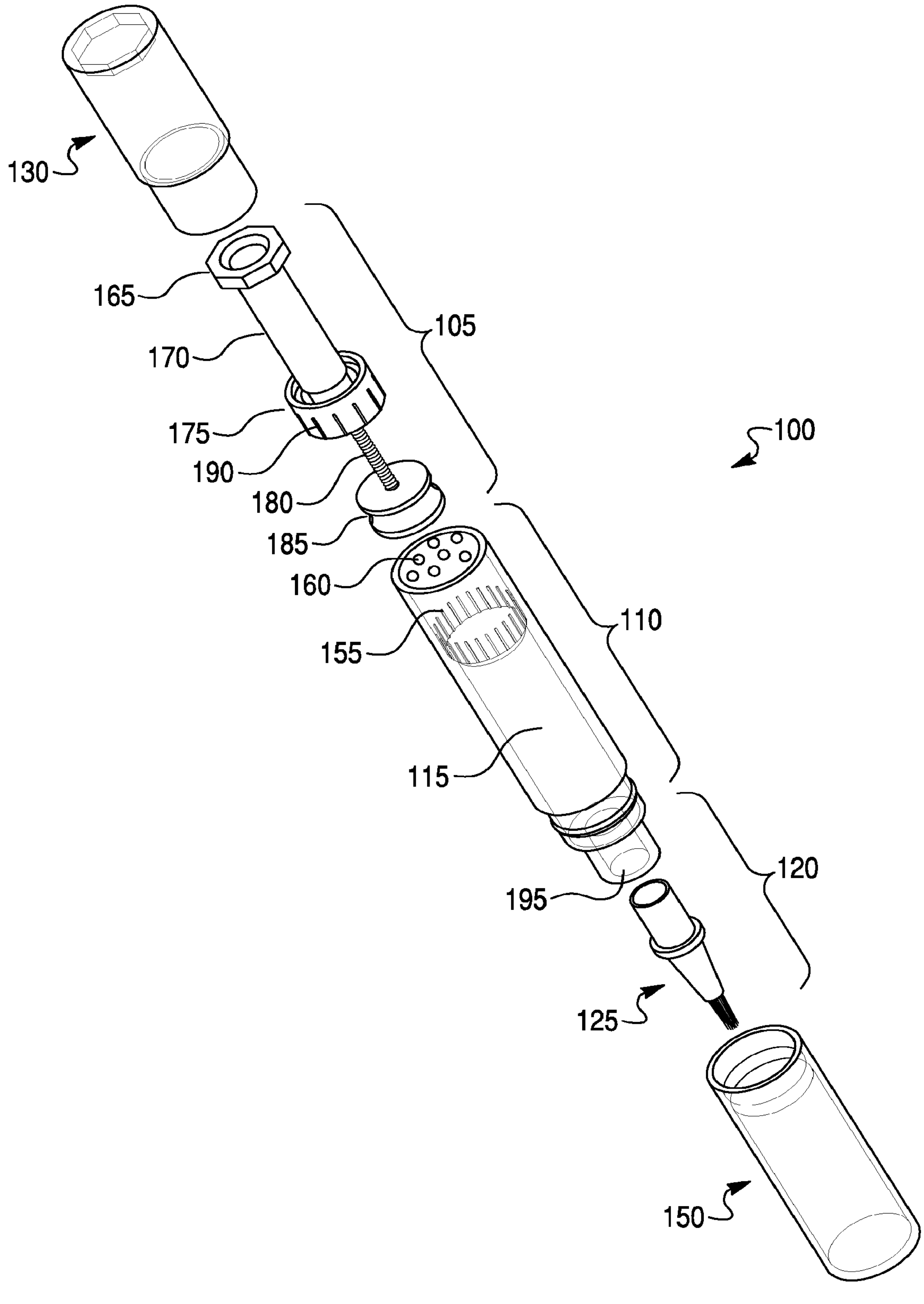
FIG. 1 is an exploded view of an embodiment of a paint applicator made in accordance with principles of the disclosed subject matter.

FIG. 1 is an exploded view of an embodiment of a paint applicator 100 made in accordance with principles of the disclosed subject matter. FIG. 1 shows that the paint applicator 100 includes a main body 110 which is cylindrical and/or pen-shaped. An applicator portion 120 for applying paint is disposed at a first or forward end of the main body 110. A cover 150 may be provided to cover the applicator 120 before and after the use of the paint applicator 100. An end cap 130 is fitted onto a second or aft end of the main body 130. As will be described in greater detail below, the end cap 130 may be communicatively coupled to an advancement mechanism 105.

According to the embodiment of FIG. 1, the main body 110 is cylindrical and pen-shaped and includes an interior volume 115 capable of receiving and holding paint. The applicator portion 120 is in fluid communication with the interior volume 115 of the main body 110 so that the applicator portion 120 can receive paint stored in the interior volume 115 to be dispensed onto a surface or substrate. In another embodiment, the main body 110 is capable of receiving a pre-filled paint cartridge which can be fitted into the interior volume 115 of the main body 110. For example, the paint can be advanced through the interior volume 115 by the advancement mechanism 105 which is described in greater detail below.

The main body 110 can be formed from a clear plastic so that the user can see the color and level of the paint. In one embodiment, small ball bearings 160 can be optionally added into the interior volume 115 to assist with mixing of the paint. An interior surface of the main body 110 can also be equipped with ridges 155 which are formed in a circular pattern on the interior surface. As will be discussed in greater detail below, the ridges 155 assist with maintaining the position of the advancement mechanism 105 within the interior volume 115 of the main body 110.

As described above, FIG. 1 also shows the applicator portion 120 which is fitted onto a first end of the main body 110. In some embodiments, the interior volume 115 of the main body 110 can be filled with paint when the applicator portion 120 is disconnected from the main body 110. Then, the applicator portion 120 can be fitted onto the main body 110 through a variety of mechanisms. For example, it can be snap fitted onto the main body 110 or it can be screwed onto the main body 110 when the applicator portion 120 and the main body 110 are each fitted with one of threads or notches for receiving the threads. The applicator portion 120 is capable of receiving paint delivered from the interior volume 115 of the main body 110. The applicator portion 120 can then be used to apply paint onto a surface or substrate. The applicator portion 120 can also include a tip 125 which absorbs paint delivered through the interior volume 115 of the main body 110 and which is used to apply paint to a surface. An opening 195 can be formed at an end of the main body 110 for receiving paint and can be closed by attachment of the tip 125. The tip 125 can include a variety of different mechanisms for applying paint. For example, in FIG. 1, the tip 125 is shown as a paint brush. However, the disclosed subject matter contemplates that the tip can be any type of mechanism suitable for applying paint, such as a sponge, wick, paper product, etc.

FIG. 1 also shows the end cap 130 which is disposed at the far end of the main body 110. In some embodiments, the end cap 130 is fixed to the main body 110 so that it cannot be removed. In other embodiments, the end cap 130 can be removed in order to expose the interior volume 115 of the main body 110. In these embodiments, when the end cap 130 is removed, the interior volume 115 can be filled with a paint selected by the user. Alternately, when the end cap 130 is removed, a pre-filled paint cartridge holding paint can be inserted into the interior volume 115 of the main body 110. In this embodiment, once the interior volume 115 of the main body 110 is filled with paint, the end cap 130 can be placed back onto the end of the main body 110 so that the interior volume 115 is sealed.

As will be described in greater detail below, the end cap 130 can also be used to drive the advancement mechanism 105 which forces the paint toward the applicator portion 120 to ensure that the applicator is wetted with enough paint so that it can be smoothly applied to a surface. Thus, rotation of the end cap 130 engages the advancement mechanism 105 in such a manner that the rotational force applied to the end cap 130 is translated to a linear force applied to a piston which pushes the paint toward the applicator portion 120.

FIG. 1 also shows the advancement mechanism 105 which includes an advancement head 165, and an advancement arm 170. The advancement mechanism also includes a base 175, a stem 180 and a piston head or plunger 185. The advancement head 165 of the advancement mechanism 105 can be fitted into a tip end of the end cap 130, so that rotation of the end cap 130 causes rotation of the advancement head 165 and the advancement arm 170. The piston head 185 faces and contacts the paint. An outer edge or rim of the piston 185 makes contact with the inner surface of the interior volume 115 of the main body 110 when the advancement mechanism 105 is placed into the interior volume 115. The piston 185 is advanced or retracted by the interaction between the advancement arm 170 and the stem 180 which each have mating threads. The base 175 also includes notches 190 which are formed along an outer edge of the base 175. The notches 190 can mate with the ridges 155 formed on the interior surface of the main body 110 so that the advancement mechanism is fixed into the interior volume 115. As shown in FIG. 1, the advancement arm 170 extends from a bottom surface of the advancement head 165. The advancement arm 170 has interior threads (not shown in FIG. 1) that can engage the threads formed on the stem 180. Thus, the advancement head 165 can be fitted into the end cap 130 so that a rotational force applied to the end cap 130 also causes rotation of the advancement head 165. This rotational force also causes the advancement arm 170 to rotate so that the interior threads of the advancement arm 170 engage the threads of the stem 180 so that the piston head 185 moves in a linear direction away from the end cap 130. In this manner, the piston 185 is advanced through the interior volume 115 toward the tip 125 so that paint that occupies the interior volume 115 is forced onto the tip 125. Thus, in use, a user can rotate the end cap 130 to apply more paint to the tip 125 as it dries or needs replenishment. In this manner, a user can apply paint without the risk of spilling or wasting paint.

The advancement mechanism 105 is configured so that the piston 185 can be retracted and the interior volume 115 can be cleaned and refilled allowing for multiple uses. In an alternate embodiment discussed below with reference to FIG. 4, the piston can only be moved in a direction towards the tip and cannot be retracted. In this embodiment, the paint applicator is a single use/disposable device which cannot be reused. Thus, once the user has used all of the paint contained in the interior volume, the paint applicator can then be disposed of.

Figure 2:
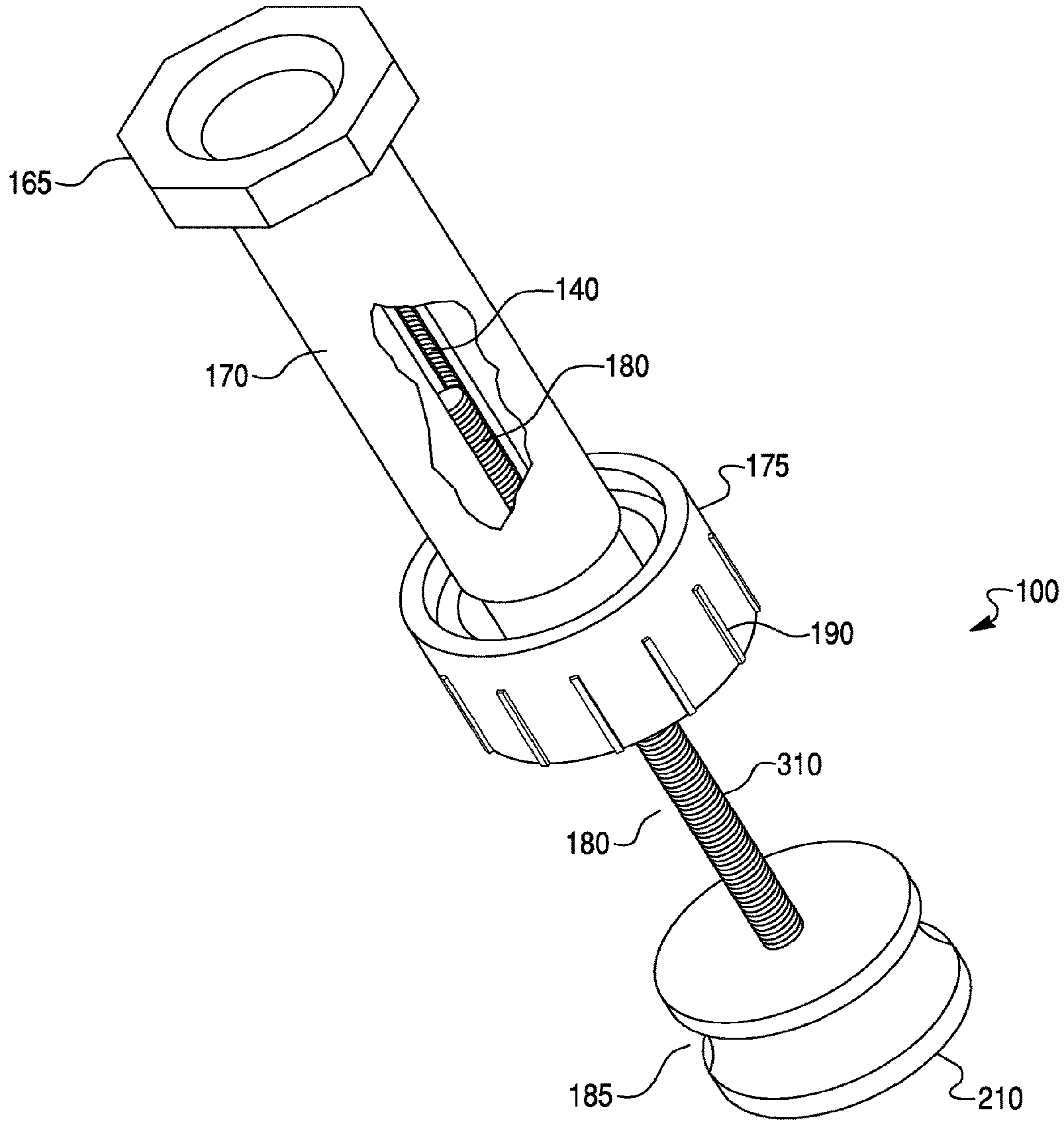
FIG. 2 is a perspective cut-away view of an advancement mechanism in accordance with an embodiment of the disclosed subject matter.
Figure 3:
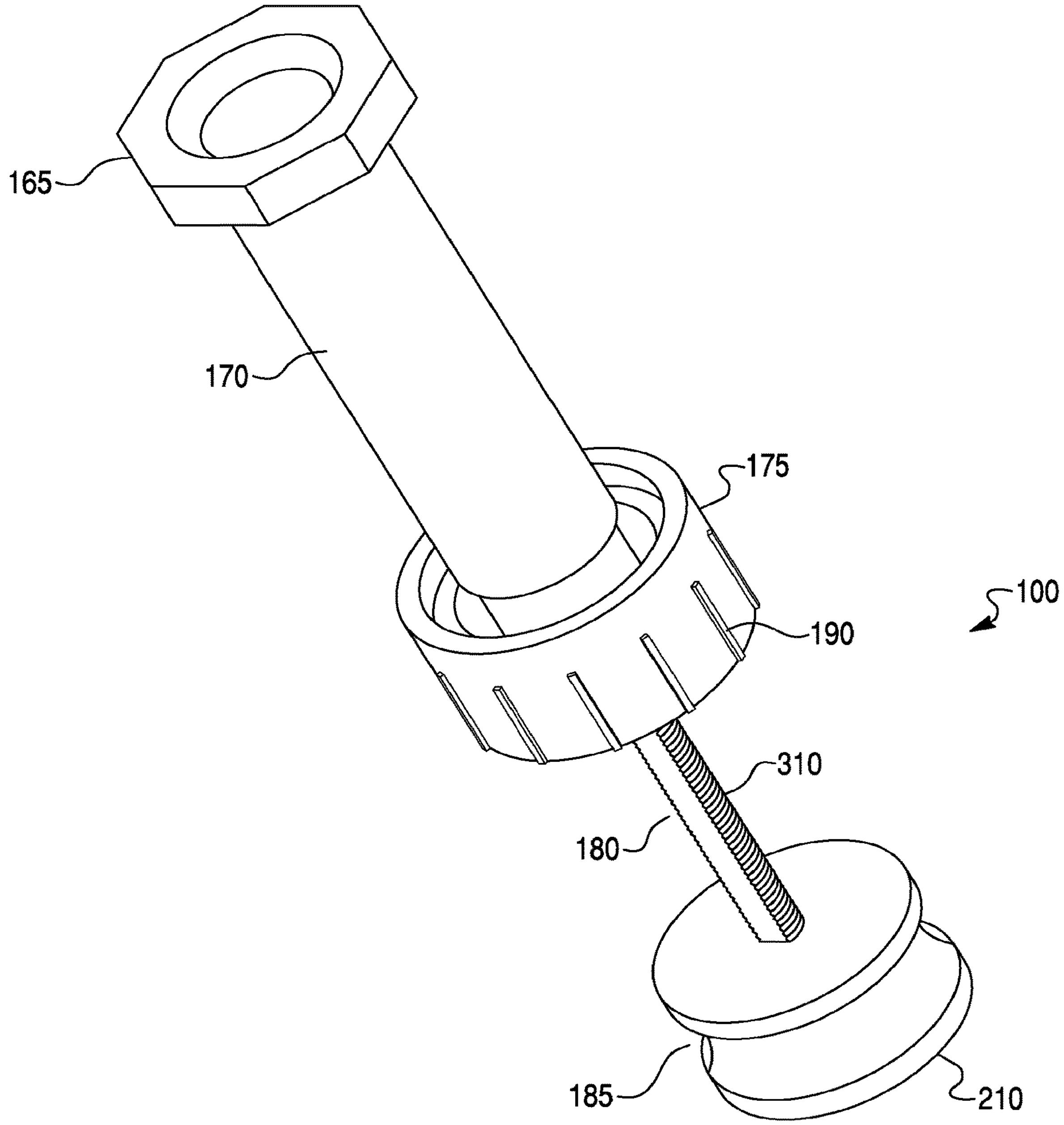
FIG. 3 is a perspective view of the advancement mechanism according to an embodiment of the disclosed subject matter.

FIG. 2 shows a perspective view of the applicator 100 of FIG. 1. FIG. 2 shows the advancement head 165 and the advancement arm 170 in communication with the base 175. As discussed above, both the advancement head 165 and the advancement arm 170 rotate when the end cap 130 (shown on FIG. 1) is rotated. FIG. 2 also shows that a base 175 is provided between the stem 180 and the plunger 185. The base 175 has notches 190 formed in a circular pattern around its outer periphery. The notches 190 mate with the ridges 155 formed on the interior surface of the interior volume 115 so that the base does not rotate when the advancement head 165 and advancement arm 170 are rotated. The base also includes a keyhole structure (not shown) through which the stem 180 is positioned so that it mates with interior threads 140 formed in the inner surface of the advancement arm 170 (see FIG. 3). In this manner, rotation of the advancement head 165 causes rotation of the advancement arm 170 which causes the threads 140 to engage threads 310 of the stem to produce linear movement of the stem 180. In the embodiment of FIGS. 1-3, the stem 180 and plunger 185 can be extended or retracted depending upon the rotational direction of the advancement head 165 and the advancement arm 170. FIG. 2 also shows an outer edge 210 of the piston head 185 that contacts the inner surface of the main body 110 to ensure that all or most of the paint loaded into the inner volume 115 is advanced.

FIG. 3 shows a perspective view of an applicator 100 with some minor modifications. In FIG. 3, the stem 180 has a substantially rectangular cross-sectional shape with rounded edges so that threads 310 are only formed along the rounded edges and there are two opposed flat surfaces between the screw threads. These two flat surfaces are configured to act in coordination with a mating rectangular keyway located on the interior surface on the central axis of the base 175. It is noted that the advancement arm 170 is rotatable with respect to the base 175 (and therefore with respect to stem 180 and main body 110). The mating keyway surface of the base 175 prevents the stem 180 from rotating with respect to the base 175 and therefore also prevents rotation with respect main cylinder body 115. Thus, rotary movement of the end cap 130 is reliably transferred to linear movement of the piston 185 and stem 180.

The paint applicator 100 according to the disclosed embodiments provides a fillable device allowing users to fix paint blemishes without requiring the purchase of a large volume of paint. Instead, paint vendors can sell the paint applicators prefilled with a color requested by a consumer. The consumer can then purchase paint applicators 100 prefilled with the type of paints desired by the consumer and use them when needed. The paint applicator 100 can be light weight and maneuverable so that a user does not require any specialized skill in order to dispense paint for touch-up applications. In particular, the paint applicator 100 can be made primarily from transparent or clear polymers (except possibly for the tip 125 itself). The configuration of the applicator 100 also allows the user to accurately and precisely apply touch up paint to an area without over painting or without damaging the surface being painted. The paint applicator 100 will typically be filled with a water based, acrylic, latex and/or otherwise low VOC paint which has good flow properties and which will not easily dry and clog the mechanism.

A user seeking to use the paint applicator 100 will first seek to load the interior volume 115 with paint. The paint applicator 100 may be configured with the applicator portion 120 already attached to the main body 110, or, alternately, with the applicator portion 120 disconnected from the main body 110. For packaging purposes, the applicator portion 120 can be nested to the interior volume 115 to reduce the size of the applicator 100. In this case, the user can remove the applicator portion 120 and attach it to the main body 110. In some embodiments, the applicator portion 120 can be snap fitted onto the end of the main body 110. In other embodiments, the applicator portion 120 and the end of the main body 110 can be equipped with threads that allow the applicator portion 120 to be screwed into the main body 110. It is also contemplated that multiple applicator portions 120 can be provided with the device so that a user can quickly change out a dry applicator and/or can quickly change color of paint being used by the device. In one embodiment, the user can fill the interior volume 115 with paint when the applicator portion 120 is removed from the main body 110. In order to minimize spills, the user can remove paint from a paint container using a syringe or other paint transfer structure and then deposit the paint from the syringe into the interior volume of the applicator 100. In another embodiment, the paint can be deposited from the other end of the applicator 100 by removing the end cap 130.

In another embodiment, a paint cartridge can be loaded into the interior volume 115 of the paint applicator. Preloaded paint cartridges have the added advantage that the user does not have to handle paint. The paint cartridge can be in many various forms, including a sealed plastic bag that is punctured after insertion into the interior volume 115. Alternatively, plastic cylinders pre-filled with paint could be sold that fit within the interior volume 115 and only disperse paint when a force is applied to one or both ends of the plastic cylinder.

Once the interior volume 115 is loaded with paint, the user can rotate the end cap 130 into order to wet the tip 125. Rotating the end cap 130 cause the end cap 130 to engage and rotate the advancement head 165. Rotation of the advancement head 165 also causes rotation of the advancement arm 170 which in turn causes the linear advancement of the stem 180 in a direction toward the tip 125. As the stem 180 advances, the piston 185 also advances pushing the paint in the direction of the tip 125. The user can continue to turn the end cap 130 until the tip 125 has enough paint for the desired use. When the user determines that the tip requires more paint, he or she can advance the paint by turning the end cap 130. As described above, the base 175 generally holds the advancement mechanism 105 in place through the engagement of the notches 190 with the ridges 155.

Once the user has completed the project, the user can either dispose of the applicator 100 or can retract the piston 185 by turning the end cap 130 in a direction opposite to the direction turned for advancing the piston. The user can then clean out the inner volume 115 and reuse the applicator as needed.

Figure 4:
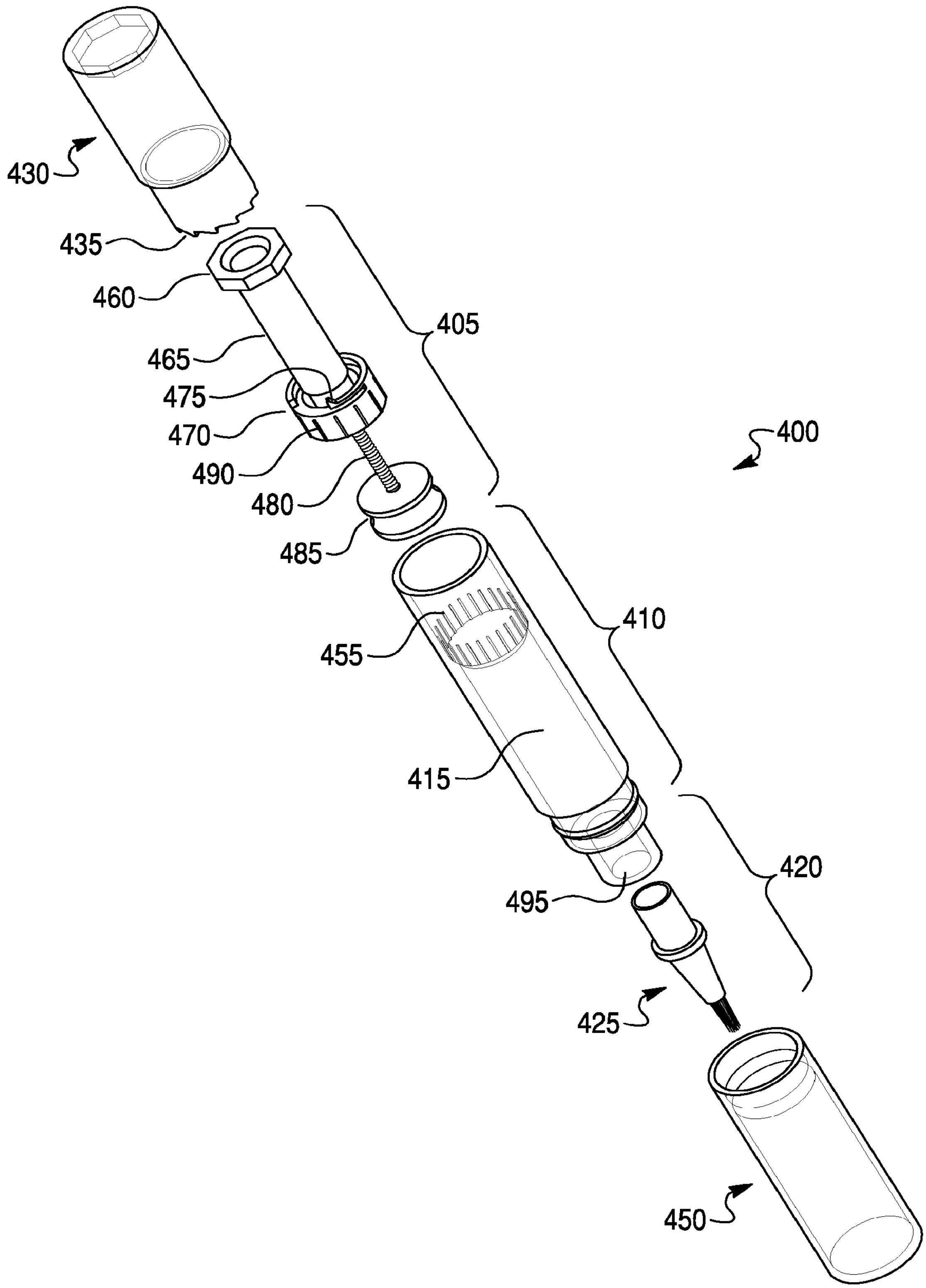
FIG. 4 is an exploded view of another embodiment of the paint applicator in accordance with principles of the disclosed subject matter.

FIG. 4 is an exploded view of another embodiment of a paint applicator 400 in which the advancement mechanism cannot be retracted once the piston is advanced. Thus, the embodiment of FIG. 4 can be considered a single use device. FIG. 4 shows a paint applicator 400 that includes a main body 410 which is cylindrical and/or pen-shaped. An applicator portion 420 for applying paint is disposed at a first or forward end of the main body 410. A cover 450 may be provided to cover the applicator portion 420 before and after use of the paint applicator 400. An end cap 430 is fitted onto a second or aft end of the main body 410. The end cap 430 includes a plurality of engagement teeth 435 which engage an advancement mechanism 405 as described in greater detail below.

According to the embodiment of FIG. 4, the main body 410 is cylindrical and pen-shaped and includes an interior volume 415 capable of receiving and holding paint. The applicator portion 420 is in fluid communication with the interior volume 415 of the main body 410 so that the applicator portion 420 receives paint to be dispensed onto a surface. In another embodiment, the main body 410 is capable of receiving a pre-filled paint cartridge which can be fitted into the interior volume 415 of the main body 410. In either of these embodiments, the paint can be advanced through the interior volume 415 by an advancement mechanism 405 which is described in greater detail below.

As with the embodiment of FIG. 1, the main body 410 can be formed from a clear plastic so that the user can see the color and level of the paint. In one embodiment, small ball bearings (not shown in FIG. 4) can be optionally added into the interior volume 415 to assist with mixing of the paint. An interior surface of the main body 410 can also be equipped with ridges 455 which are formed in a circular pattern on the interior surface. As will be discussed in greater detail below, the ridges assist with maintaining the position of the advancement mechanism 405 within the interior volume of the main body 410.

In one embodiment, the applicator portion 420 can be removably fitted onto a first end of the main body 410. In these embodiments, the interior volume 415 of the main body 410 can be filled with paint when the applicator portion 420 is disconnected from the main body 410. Then, the applicator portion 420 can be fitted onto the main body 410 through a variety of mechanisms. For example, it can be snap fitted onto the main body 410 or it can be screwed onto the main body 410 if the applicator portion 420 and the main body are each fitted with one of threads or notches for receiving the threads. The applicator portion 420 is capable of receiving paint delivered from the interior volume 415 of the main body 410. The applicator portion 420 can then be used to apply paint onto a surface or substrate. The applicator portion 420 can also include a tip 425 which absorbs paint delivered through the interior volume 415 of the main body 410 and is used to apply paint to a surface. An opening 495 can be formed at an end of the main body 410 for receiving paint and can be closed by attachment of the tip 425. The tip 425 can include a variety of different mechanisms for applying paint. For example, in FIG. 4, the tip 425 is shown as a paint brush. However, the disclosed embodiments contemplate that the tip can be any type of mechanism suitable for applying paint, such as a sponge, wick, paper product, etc.

FIG. 4 also shows the end cap 430 which is disposed at the far end of the main body 410. In some embodiments, the end cap 430 is fixed to the main body 410 so that it cannot be removed. In other embodiments, the end cap 430 can be removed in order to expose the interior volume 415 of the main body 410. In these embodiments, when the end cap 430 is removed, the interior volume 415 can be filled with a paint selected by the user. Alternately, when the end cap 430 is removed, a pre-filled paint cartridge holding paint can be inserted into the interior volume 415 of the main body 410. For example, once the interior volume 415 of the main body 410 is filled with paint, the end cap 430 can be placed back onto the end of the main body 410 so that the interior volume 415 is sealed.

The end cap 430 can also be used to drive the advancement mechanism 405 which forces the paint toward the applicator portion 420 to ensure that the tip 425 is wetted with enough paint so that it can be applied to a surface. The end cap 430 can be rotated so as to engage the advancement mechanism 405 in such a manner that the rotational force applied to the end cap 430 is translated to a linear force applied to a piston which pushes the paint toward the applicator portion 420. The end cap can be securely fitted onto the end of the main body 410 so as to engage a portion of the advancement mechanism 405.

FIG. 4 also shows the advancement mechanism 405 which includes a ratchet head 460 and a ratchet arm 465. The advancement mechanism 405 also includes a base 470, a stem 480 and a piston head or plunger 485. The ratchet head 460 of the advancement mechanism 405 can be fitted into the end cap 430, so that rotation of the end cap 430 cause rotation of the ratchet head 460 and the ratchet arm 465. The piston head 485 faces and contacts the paint. An outer edge or rim of the piston 485 makes contact with the inner surface of the interior volume 415 of the main body 410 when the advancement mechanism 405 is placed into the interior volume 415. The piston 485 is advanced or retracted by action of the ratchet arm 465 which contacts the stem 480 and which each have mating threads. The base 470 includes notches 490 which are formed along an outer edge of the base 470. The notches 190 can mate with the ridges 455 formed on the interior surface of the main body 410 so that the advancement mechanism 405 is fixed into the interior volume 415. As shown in FIG. 4, the ratchet arm 465 extends from a bottom surface of the ratchet head 460. The ratchet arm 465 has interior threads (not shown in FIG. 4 but similar to threads 140 of FIG. 2) that can engage the threads formed on the stem 480. Thus, the ratchet head 460 can be fitted into the end cap 430 so that a rotational force applied to the end cap 430 also causes rotation of the ratchet head 460. This rotational force also causes the ratchet arm 465 to rotate so that the interior threads of the ratchet arm 465 engage the threads of the stem 480 so that both the stem 480 and the piston head 485 move in a linear direction away from the end cap 430. In this manner, the piston 485 is advanced through the interior volume 415 toward the tip 425 so that paint that occupies the interior volume 415 is forced onto the tip 425. Thus, in use, a user can rotate the end cap 430 to apply more paint to the tip 425 as it dries or needs replenishment. In this manner, a user can apply paint without the risk of spilling or wasting paint.

The advancement mechanism 405 is configured so that the piston 485 cannot be retracted and can only move in a direction of the tip 425. Thus, in this embodiment, the paint applicator 400 is a single use/disposable device which cannot be reused. Thus, once the user has used all of the paint contained in the interior volume 415, the paint applicator 400 can then be disposed of. As shown in FIG. 4, the end cap 430 includes ratchet teeth 435 formed along the circumference of the lower end of the end cap 430. The base 470 also includes at least one ratchet arm 475 formed along a top surface of the base 470. The combination of the ratchet teeth 435 and ratchet arms 475 forms a system in which the end cap 430 and the ratchet arm 465 are allowed to rotate in a first direction (e.g., clockwise as shown in FIG. 4) and are prevented from rotating in an opposite direction. Thus, this structure provides for incremental advancement of the piston in only one direction, e.g., the direction of the tip 425. The ratchet teeth 435 can be in constant communication with the ratchet arms 475 by spring bias of the ratchet arms 475. When the end cap 430 is rotated, the ratchet teeth 435 pass by the ratchet arms 475 which then, in a step-wise fashion, limit advancement of the piston 485. The ratchet teeth 435 and ratchet arms 475 are also configured so that the end cap can only be turned in one direction, for advancement of the piston 485. The engagement teeth 435 and ratchet arms 475 are oriented in such a fashion that they will not allow reverse motion of the end cap 430.

Figure 5:
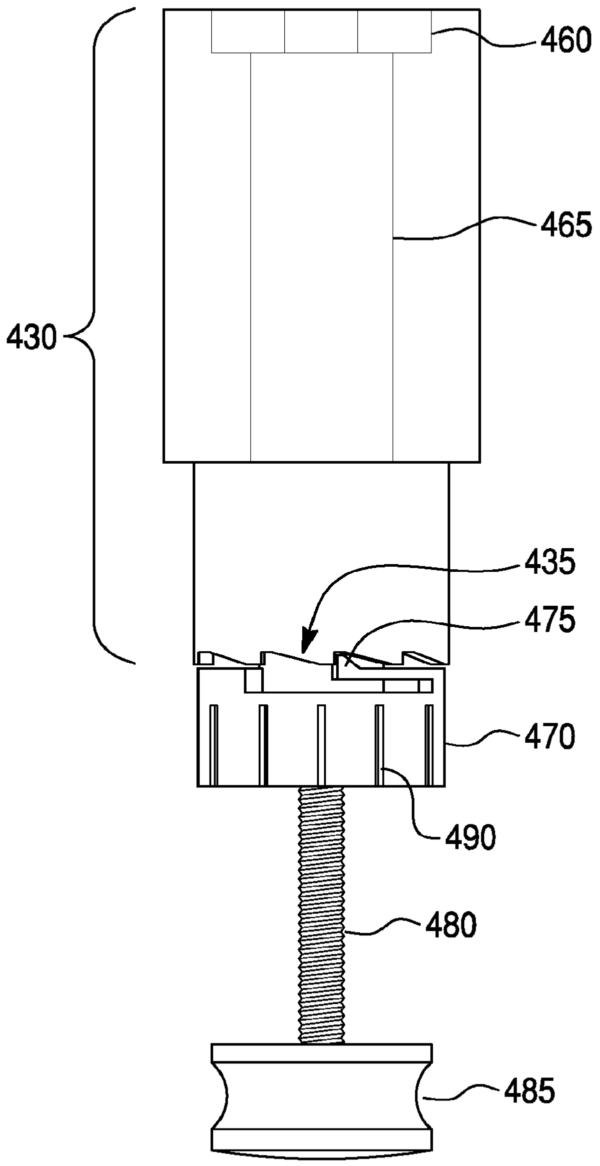
FIG. 5 is a plan view of the advancement mechanism of the embodiment of FIG. 4.

FIG. 5 shows a plan view of the advancement mechanism 405 and end cap 430 of FIG. 4. FIG. 5 shows that the end cap 430 includes engagement teeth 435 formed along its lower surface. FIG. 5 also shows that the ratchet head 460 and ratchet arm 465 are fitted into the end cap 430. FIG. 5 further shows the base 470 that includes ratchet arms 475 and notches 490. A stem 480 includes a piston head 485 while the opposing end of the stem 480 extends through a key hole (not shown) formed in the base 470 and into an opening formed in the ratchet arm 465. The opening of the ratchet arm 465 includes threads (like those shown in FIG. 2) that engage with the threads of the stem 480. Thus, rotation of the end cap 430 causes the stem 480 to extend or move in a linear direction. The ratchet teeth 435 and ratchet arms 475 form a system that allows to piston 485 to advance in an incremental or step-wise fashion. This prevents a user from discharging the paint too quickly and also prevents retraction of the piston 485 toward the direction of the end cap 430. As shown in FIG. 5, when the user rotates the end cap 430 in a clockwise manner, the ratchet teeth 435 ride along a top surface of the ratchet arms 475 allowing rotation in an incremental manner. The sloped orientation of the ratchet teeth 435 prevents rotation in a counterclockwise direction because the ratchet arms 475 block rotation of the ratchet teeth in a counterclockwise direction.

Figure 6:
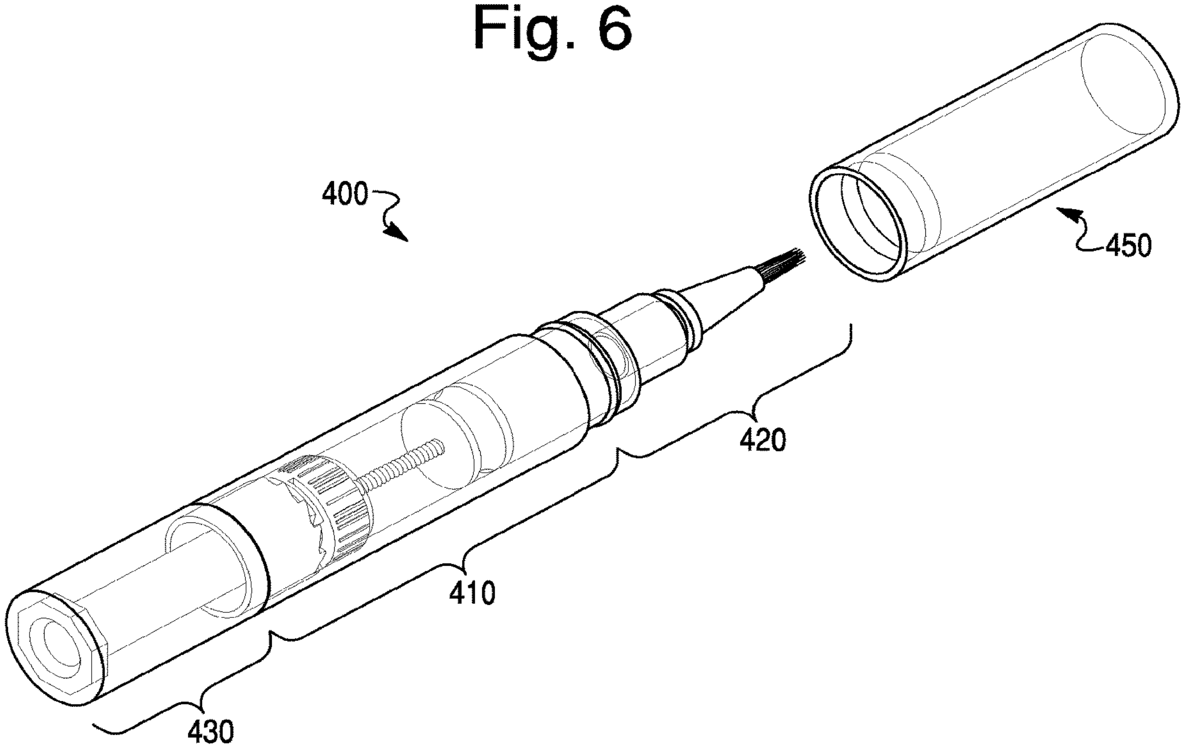
FIG. 6 is a perspective view of the paint applicator of FIG. 4.

FIG. 6 shows the applicator 400 of FIG. 4 with the cover or cap 450 removed so that the applicator can be used.

Figure 7:
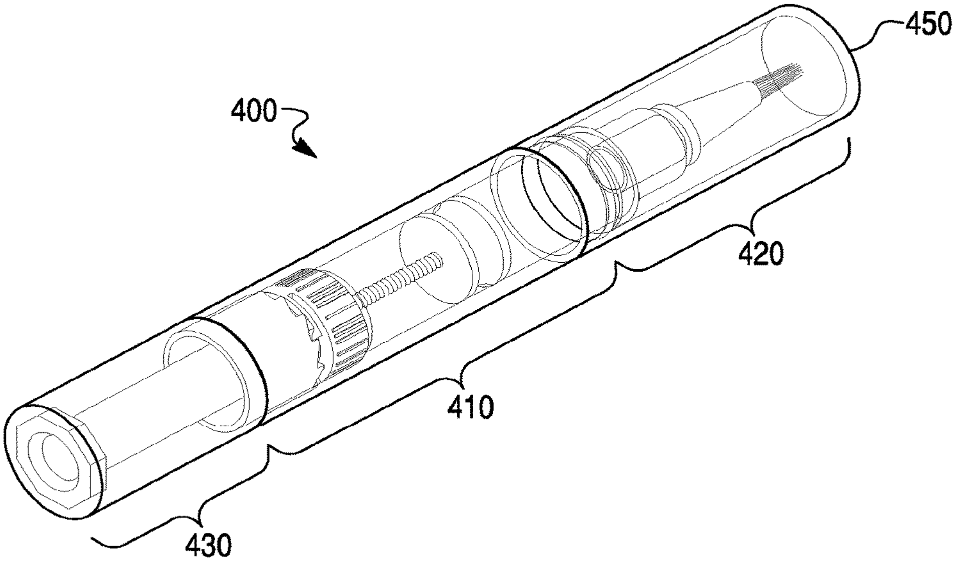
FIG. 7 is a perspective view of the paint applicator of FIG. 4.

FIG. 7 shows the applicator 400 of FIG. 4 with the cover or cap 450 fitted over the applicator portion 420 to prevent drying of the tip.

Figure 8:
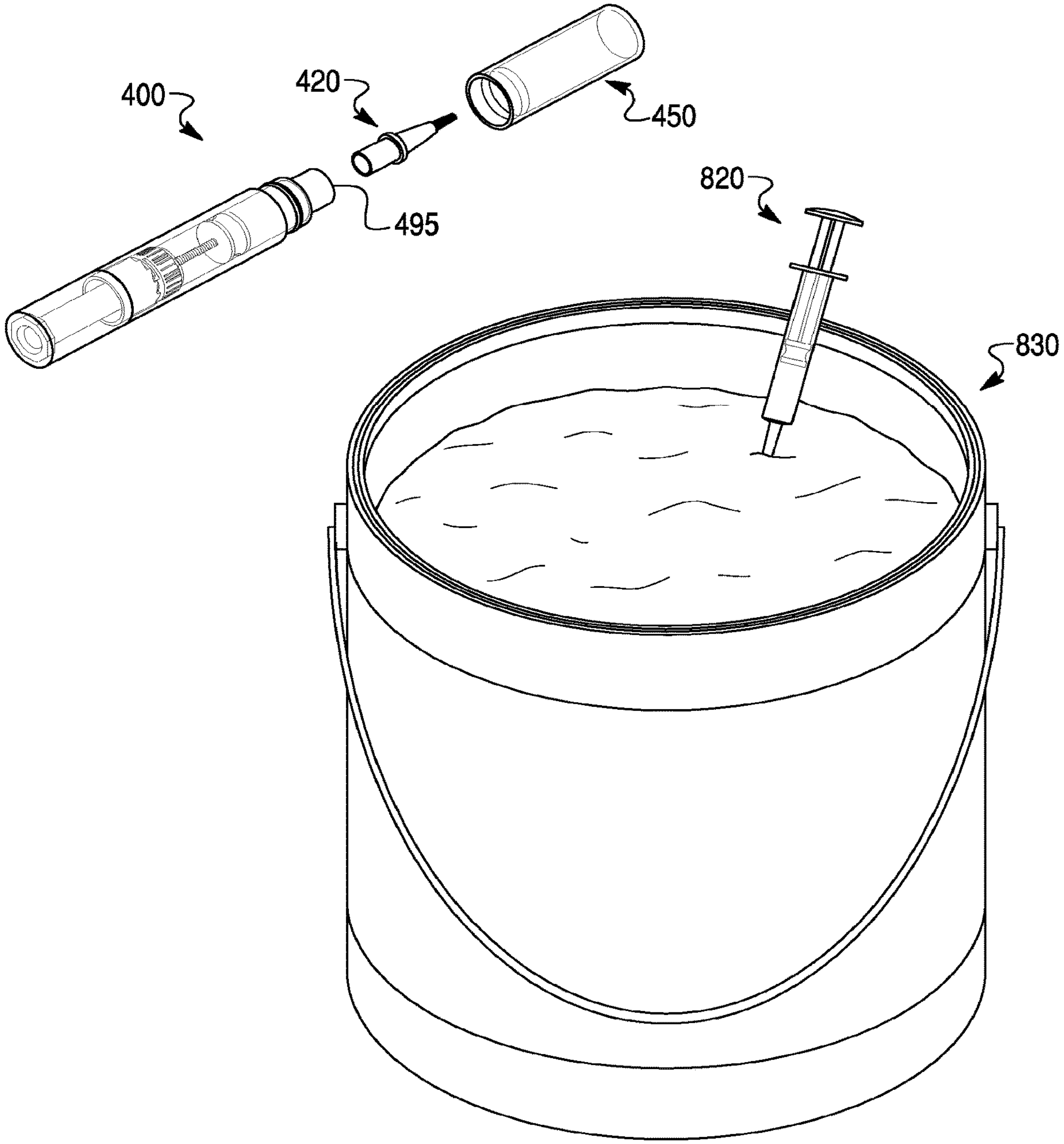
FIG. 8 is an illustration of a paint applicator kit in accordance with principles of the disclosed subject matter.

FIG. 8 shows a kit that includes an applicator 400 and a syringe 820 that can be used to load the applicator 400 with paint. A user seeking to use the paint applicator 400 will first seek to load the body of the applicator 400 with paint. As described in connection with FIGS. 1-3, the paint applicator 400 may be configured with the applicator portion 420 already attached to its main body, or, alternately, with the applicator portion 420 disconnected from the main body. For packaging purposes, the applicator portion 420 can be nested to the interior volume of the applicator to reduce its size for packaging purposes. In this case, the user can remove the applicator portion 120 and fill the applicator body through an opening 495. Thus, the user can use a paint transfer structure, such as the syringe 820, to withdraw paint from a paint container 830. The user can then dispense the paint from the syringe 820 into the body of the applicator 400 via the opening 495. Once the paint has been dispensed into the body of the applicator, the applicator portion 420 can be snap fitted onto the end of the main body of the applicator. The paint transfer structure can also be in the form of a cartridge as described above, or a sample paint tube, or other paint containing structures. In other embodiments, the applicator portion 420 and the end of the main body of the applicator can be equipped with threads that allow the applicator portion 420 to be screwed into the main body of the applicator 400. It is also contemplated that multiple applicator portions 420 can be provided with the device so that a user can quickly change out a dry applicator and/or can quickly change color of paint being used by the device. Thus, use of the syringe can minimize spills.

In another embodiment, a paint cartridge can be loaded into the interior volume of the applicator 400. Pre-loaded paint cartridges have the added advantage that the user does not have to handle paint. The paint cartridge can be in many various forms, including a sealed plastic bag that is punctured after insertion into the interior volume 415. Alternatively, plastic cylinders pre-filled with paint could be sold that fit within the interior volume of the applicator and only disperse paint when a force is applied to one or both ends of the plastic cylinder.

Once the interior volume of the applicator is loaded with paint, the user can rotate the end cap 430 in order to wet the tip 425. Rotating the end cap 430 causes the end cap 430 to engage and rotate the ratchet head 460. Rotation of the ratchet head 460 also causes rotation of the ratchet arm 465 which in turn causes the advancement of the stem 480 in a direction toward the tip 425. As the stem 480 advances, the piston 485 also advances pushing the paint in the direction of the tip 425. The user can continue to turn the end cap 430 until the tip 425 has enough paint for the desired use. When the user determines that the tip requires more paint, he or she can advance the paint by turning the end cap 430. As described above, the base 470 generally holds the advancement mechanism 405 in place through the engagement of the notches 490 with the ridges 455. Also, as described above, the ratchet system formed by the ratchet teeth 435 and the ratchet arms 475 limit movement of the piston 485 in one direction and in a stepwise incremental fashion. This can prevent a user from discharging the paint too quickly. Once the user has completed the project, the user can dispose of the applicator 400.

It should be understood that various modifications may be made to the various embodiments and modifications described above without departing from the spirit and scope of the disclosed subject matter. In particular, each of the structures shown in the various modifications and embodiments can be combined and/or exchanged with each other in accordance with various aspects and desired applications. In addition, the main cylindrical body is shown as having a shape that is circle in cross-section (when viewed along a longitudinal axis direction). However, different cross-sectional shapes for the main cylindrical body are contemplated as part of the disclosed subject matter, including polygonal, non-symmetrical, and other shapes that may be beneficial for a particular application or marketing purpose. Furthermore, if the entire length of the cylinder main body 115 has a complimentary polygonal or non-symmetrical cross-sectional shape with respect to a shape of the piston, the keyway in the base 175 may not be necessary because the piston 185 and stem 180 would be prevented from rotation by the complimentary shape of the main cylindrical body 115.

It should be understood that the applicator could be made of a variety of materials, not limited to plastics and polymers, depending on the nature and reactivity of the paint or stain. Thus, the applicator could be formed from other materials, including but not limited to glass, ceramics, metals, etc.

The apparatus, kit and method can include a plurality of different or identical tips. For example, the apparatus or kit can include different sized brushes that can be selectively used depending on the surface area, surface type, and size of the application. In addition, different types of tips can be included with the apparatus, kit and method to allow for different applications. For example, a brush tip, a ball point tip, a sponge tip, and/or other tip can all be included with the applicator so that the user has many different options and styles of use of the applicator.

The method of using the apparatus or kit as disclosed above can include using the device in conjunction with stains, furniture stains or polishes in order to touch up furniture, statues, paintings or other artwork. The use of the disclosed apparatus and kit in such a method allows quick, easy, and clean touch ups that can easily be conducted by the homeowner, sales agents, interior decorators and others without requiring drop cloths, tapings, and other items typically required when painting or touching up items located within a furnished or otherwise finished room.

While there has been described what are at present considered to be exemplary embodiments of the present invention, it will be understood that various modifications may be made thereto, and it is intended that the appended claims cover all such modifications as fall within the true spirit and scope of the invention.

What is claimed is:

1. An applicator for fluids, including paint, stain, and other colorants, the applicator comprising:

a cylindrical main body having a first end and a second end, the cylindrical main body defining an interior volume configured to receive fluid, the main body made from a material that allows the color of the fluid to be seen;

an applicator structure disposed at the first end of the cylindrical main body, the applicator structure removably attached to the first end and in fluid communication with the interior volume of the cylindrical main body, the applicator structure including a tip for applying fluid from the interior volume to a surface;

an advancement mechanism disposed in the second end of the main body for advancing fluid from the interior volume to the applicator structure, the advancement mechanism including an advancement arm and a piston with a threaded piston rod, the advancement arm including threads for engaging the threaded piston rod; and a movable end cap disposed adjacent the second end of the cylindrical main body, the movable end cap operably engaged with the advancement arm, the movable end cap rotatable in a first direction for advancing linearly the piston into the interior volume for causing fluid to be communicated to the applicator structure and the movable end cap being rotatable in an opposite second direction.

2. The applicator of claim 1, wherein the cylindrical main body has a longitudinal axis, and a cross section of the main body taken perpendicular to the longitudinal axis is a circle.

3. The applicator of claim 1, wherein the applicator structure is configured as a plastic cylinder having an aperture extending from a proximal end to a distal end, and the tip includes a brush located within the aperture at the distal end of the cylinder.

4. The applicator of claim 1, wherein the end cap includes an interior keyway surface that mates with an exterior surface of the advancement arm of the advancement mechanism such that when the end cap is rotated the advancement arm also rotates.

5. The applicator of claim 1, wherein the advancement mechanism includes a base that is locked with respect to the cylindrical main body, the base including an aperture through which the advancement arm extends, the advancement arm is rotatable with respect to the base.

6. The applicator of claim 5, wherein the base includes a plurality of ridges that extend parallel with a longitudinal axis of the cylindrical main body, and wherein the cylindrical main body includes a plurality of mating ridges that are configured to mate with the ridges of the base such that the base is prevented from rotating with respect to the cylindrical main body.

7. The applicator of claim 5, wherein the base includes at least one ratchet arm and the movable end cap includes a plurality of ratchet teeth configured to mate with the at least one ratchet arm of the base such that the movable end cap is allowed to rotate relative to the base in the first direction and prevented from rotating relative to the base in the second direction.

8. The applicator of claim 7, wherein, during operation, when the movable end cap is rotated, the threads of the advancement arm cause the threaded piston rod and the piston to move within and respect to the cylindrical main body such that the interior volume of the cylindrical main body is reduced causing fluid to exit the interior volume via the applicator structure.

9. The applicator of claim 1, wherein, during operation, when the movable end cap is rotated, the threads of the advancement arm cause the threaded piston rod and piston to move within and respect to the cylindrical main body such that the interior volume of the cylindrical main body is reduced causing fluid to exit the interior volume via the applicator structure.

10. The applicator of claim 1, wherein the applicator structure is attached to the second end by one of a snap fit connection or a screw connection.

11. The applicator of claim 1, wherein the tip is a brush.

12. The applicator of claim 1, wherein the applicator structure is removable for allowing the interior volume to receive an additional volume of fluid.

13. The applicator of claim 1, wherein the interior volume is configured for holding at least one of paint, stain, and polish.

14. The applicator of claim 1, wherein the tip is one of a brush, brush tip, a ball point tip, a sponge tip, a wick, and paper.

15. An applicator kit for fluid, including paint, stain and other colorants, the kit comprising:

an applicator including, a cylindrical main body having a first end and a second end, the cylindrical main body defining an interior volume configured to receive fluid therein, the main body made from a material allowing the color of the fluid to be seen, an applicator structure removably attached to the first end of the cylindrical main body, the applicator structure in fluid communication with the interior volume of the cylindrical main body, the applicator structure including a tip for applying fluid to a surface, an advancement mechanism disposed in a second end of the cylindrical main body for advancing the fluid from the interior volume to the applicator structure, the advancement mechanism including a base and a piston with piston rod, the base including threads engaging the piston rod, and a movable end cap disposed adjacent the second end of the cylindrical main body, the movable end cap engaged to an end of the advancement mechanism, the movable end cap rotatable in a first direction for advancing linearly the piston into the interior volume for causing fluid to be communicated to the applicator structure and the movable end cap being rotatable in an opposite second direction; and a fluid transfer structure including a syringe configured to transfer fluid from a fluid reservoir to the interior volume of the cylindrical main body of the applicator.

16. The kit of claim 15, wherein the tip is one of a brush tip, a ball point tip, a sponge tip, a wick, and paper.

17. The kit of claim 15, wherein the applicator structure is attached to the second end by one of a snap fit connection or a screw connection.

18. The kit of claim 15, wherein the interior volume is configured for holding at least one of paint, stain, and polish.

19. The kit of claim 15, wherein the applicator structure is removable for allowing the interior volume to receive an additional volume of fluid from the syringe.

20. The kit of claim 15, wherein the cylindrical main body is made of a polymer.

21. A method for use of an applicator for fluids, including paint, stain, and other colorants, comprising:

providing an applicator including, a cylindrical main body having a first end and a second end, the cylindrical main body defining an interior volume configured to receive fluid, the main body made from a material that is clear or transparent;

an applicator structure configured to be removably attached to the first end of the cylindrical main body, the applicator structure including a tip for applying the fluid to a surface;

an advancement mechanism disposed in the second end of the main body and configured to advance the paint from the interior volume to the applicator structure, the advancement mechanism including a piston with a threaded piston rod; and a movable end cap disposed adjacent the second end of the cylindrical main body, the end cap engaged to an end of the advancement arm, the end cap rotatable in a first direction for advancing linearly the piston into the interior volume for causing fluid to be communicated to the applicator structure and the end cap being rotatable in an opposite second direction;

providing a fluid transfer structure configured to transfer the fluid from a fluid reservoir to the interior volume of the main body of the applicator;

transferring the fluid from the fluid reservoir to the fluid transfer structure;

transferring the fluid from the fluid transfer structure to the interior volume of the cylindrical main body of the applicator via an opening in the first end of the cylindrical main body;

placing the applicator structure in the first end of the main body such that the paint is in fluid communication with both the applicator structure and the interior volume of the cylindrical main body; and actuating the advancement mechanism such that the piston and the threaded piston rod move within the interior volume of the cylindrical main body and cause the fluid from the interior volume to move to the applicator structure.

* * * * *